United States Patent [19]

Noguchi et al.

[11] Patent Number: 4,987,333
[45] Date of Patent: Jan. 22, 1991

[54] ELECTRIC MOTOR WITH INNER DRIVE PULLEY

[75] Inventors: Naoto Noguchi, Hirakata; Isao Shinohara, Ikoma, both of Japan

[73] Assignee: Matsushita Electric Industrial Co., Ltd., Osaka, Japan

[21] Appl. No.: 494,626

[22] Filed: Mar. 16, 1990

[30] Foreign Application Priority Data

Mar. 22, 1989 [JP] Japan ................... 1-69728

[51] Int. Cl.5 ............................................. H02K 7/10
[52] U.S. Cl. ............................... 310/268; 310/67 R; 474/166; 360/98.06
[58] Field of Search ............. 310/66, 67 R, 75 C, 310/112, 114, 263; 360/98.06; 474/166

[56] References Cited

U.S. PATENT DOCUMENTS

| | | | |
|---|---|---|---|
| 4,167,692 | 9/1979 | Sekiya et al. | 310/90 |
| 4,461,967 | 7/1984 | Motoyama | 310/268 |
| 4,607,808 | 8/1986 | Collins | 474/166 |
| 4,654,551 | 3/1987 | Farr | 310/112 |

FOREIGN PATENT DOCUMENTS 60-141158 7/1985 Japan .
61-226058 11/1986 Japan .
62-25859 2/1987 Japan .

Primary Examiner—Steven L. Stephan
Assistant Examiner—D. L. Rebsch
Attorney, Agent, or Firm—Stevens, Davis, Miller & Mosher

[57] ABSTRACT

In a brushless motor formed from a plate type stator in which a driving coil is buried, and a rotor which opposes this stator, a cutout is formed in a portion where no driving coil of a stator exists and a pulley section is provided in the periphery of the shaft-through section of the rotor. The pulley section is inserted into the rotor shaft hole formed in the center of the stator, and a pulley belt wound on the pulley section is guided outside the motor via the cutout of the above-mentioned stator. That is, the brushless motor is of an ultra-thin type in which a pulley is housed within the thickness of a motor.

4 Claims, 6 Drawing Sheets

ELECTRIC MOTOR WITH INNER DRIVE PULLEY

BACKGROUND OF THE INVENTION

The present invention relates to a flat type brushless motor for use in a small tape recorder, and particularly to a brushless motor of a thin type.

In recent years, as tape recorders have become smaller, flat type brushless motors have been widely used. One example of a brushless motor which is used conventionally in a tape recorder is shown in FIG. 11. In this figure, numeral 11 denotes a brushless motor main body. In this main body 11, a stator coil and a rotor member having a permanent magnet are housed. A rotor shaft 12 projects from the main body 1 and a pulley member 13 is disposed on the shaft 12. A belt is fitted to the pulley member 13, thereby transmitting a driving force therethrough.

In the above-mentioned conventional brushless motor, no matter how much thinner a stator coil and a rotor member contained in the motor main body is made, because the pulley member on the output axis is exposed, the motor as a whole including this pulley member cannot be made thinner.

The present invention has been devised in light of the above-mentioned conventional problems. An object of the present invention is to provide a brushless motor capable of being made thinner by disposing a pulley member that bears a belt, in the motor main body.

SUMMARY OF THE INVENTION

In order to solve the above-mentioned conventional problems, the brushless motor of the present invention comprises a stator coil member in which a cutout is formed extending to the rotor shaft hole formed in the center part thereof with a plurality of driving coils being incorporated therein, a rotor member for holding a permanent magnet which rotates oppositely facing the driving coils, a bracket member for holding the stator coil member and for holding a rotor member rotatably, and a subrotor member held in the rotor member in such a way that the stator coil member is sandwiched between the same and the permanent magnet of the above-mentioned rotor member. This brushless motor is so designed that a pulley member rotates in a unit with the rotor member and is positioned in the rotor shaft hole section of the stator coil member so that a belt which fits to this pulley member is pulled out via the cutout of the stator coil member. Accordingly, the rotor member and the subrotor member, so positioned as to sandwich the stator coil member fixed on the bracket member, are rotatable. The pulley member positioned on the rotor shaft hole section of the stator coil member is also rotatable. The belt fitted to this pulley member is drawn out from the cutout formed in the stator coil member and motor rotation output is picked out.

These and other objects, features and advantages of the present invention will become clear in the following description of the preferred embodiments of the present invention, together with reference to the accompanying drawings.

EMBODIMENTS

The brushless motor in a first embodiment form of the present invention will be explained in detail hereinunder with reference to the accompanying drawings.

Figure 1:
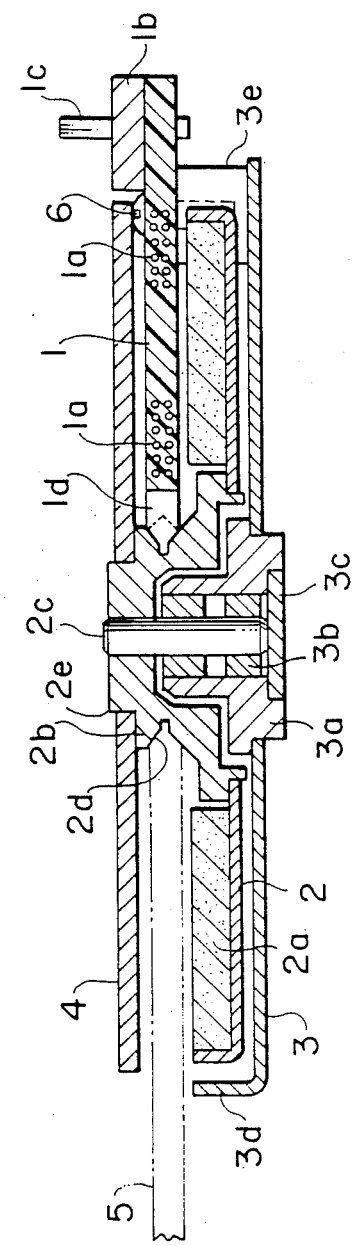
FIG. 1 is a sectional side view, illustrating a brushless motor in a first embodiment form of the present invention, which is taken along the X—X line in FIG. 2.
Figure 2:
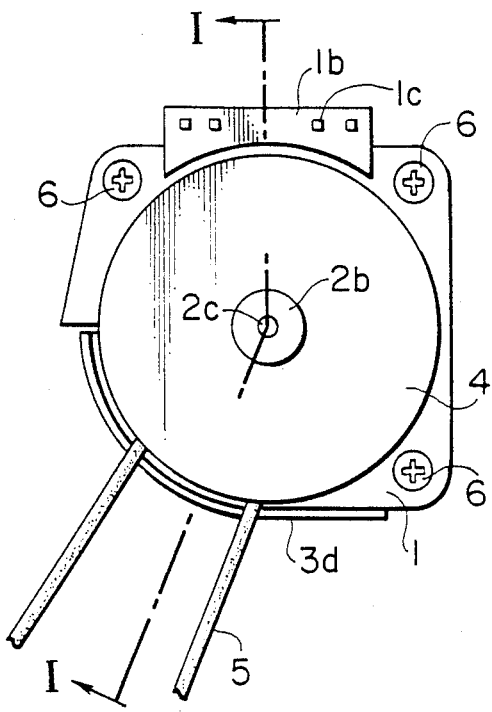
FIG. 2 is a front view of a brushless motor in the first embodiment form of the present invention.
Figure 3:
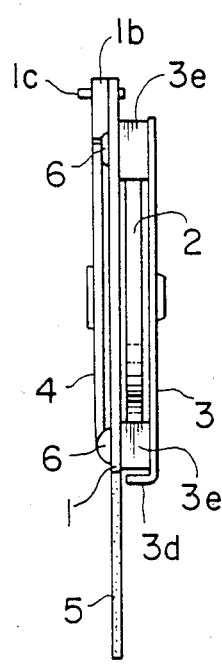
FIG. 3 is a side elevational view of a brushless motor in one embodiment form of the present invention.
Figure 4:
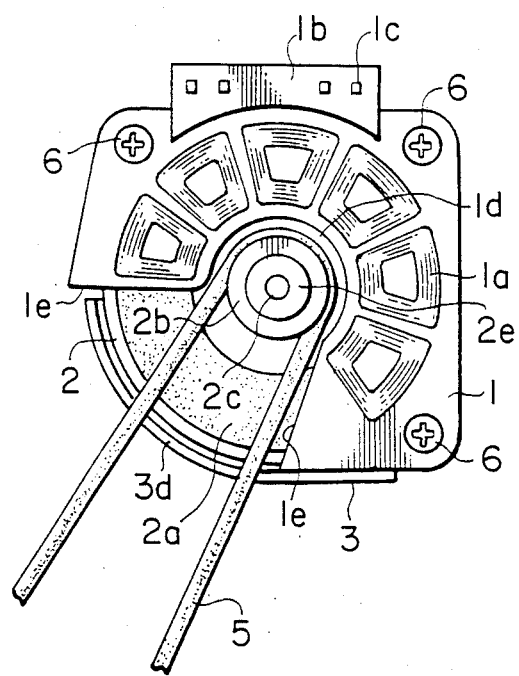
FIG. 4 is a front view of a brushless motor in which a subrotor member is removed in the first embodiment form of the present invention.
Figure 5:
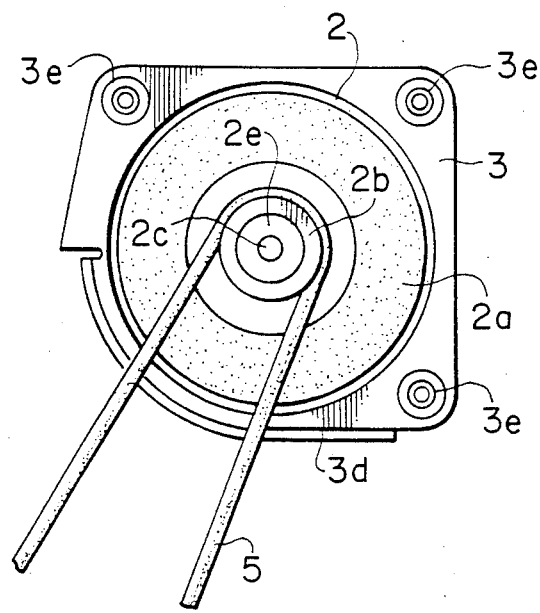
FIG. 5 is a front view of a brushless motor in which a stator coil member is removed in the first embodiment form of the present invention.

In FIG. 1, numeral 1 denotes a stator coil member made of synthetic resin. This stator coil member 1 has a driving coil 1a formed by integral molding and a pin-like terminal member 1c held on a terminal holding member 1b for connecting this driving coil 1a to a control circuit. In the center of the stator coil member is formed a stator shaft hole 1d into which a pulley section of the rotor member described later is inserted. In a portion of the stator coil member where the above-mentioned driving coils 1a are not formed, a cutout 1e is formed. Rotor member 2 holds a permanent magnet 2a in such a manner as to oppositely face the driving coil 1a, and also has a pulley member and a shaft member 2c. Further, in the above-mentioned pulley section 2b, a belt groove 2d and a projection 2e for engaging with a subrotor are formed. Bracket member 3 has a bearing 3b and a bearing member 3a in which a thrust plate 3c is provided. In the peripheral edge of the bracket member which has a bent integral shield wall 3d, columns 3e for holding the above-mentioned stator coil member 1, are provided. Subrotor 4 is engaged with the projection 2e formed on the above-mentioned pulley member 2b. This subrotor 4 is held on the pulley member 2b by the magnetmotive force of the permanent magnet 2a held on the rotor section 2. This subrotor 4 and the permanent magnet 2a of the rotor section 2 are positioned so as to sandwich the stator coil member 1 therebetween. Belt 5 is fitted to the belt groove 2d formed on the above-mentioned pulley section 2b so as to pick out the rotation force of the rotor member 2. Screw 6 fastens the stator coil member 1 to the column 3e of the bracket member 3.

In the above construction, as shown in the cross sectional view of FIG. 1, the stator coil member 1 and the belt groove 2d are positioned in at almost the same plane. This positioning is completed by fixedly fastening the stator coil member 1 to the column 3e provided on the bracket member 3 and by rotatably holding the pulley member 2b on the bearing 3b and the thrust plate 3c provided on the bracket member 3 via the shaft member 2c. The belt 5 which is fitted to the belt groove 2d of the pulley section 2b is pulled out to the outside via the cutout 1e formed in the stator coil member 1. The draw-out section for the belt 5 formed by the cutout 1e is formed from a portion which opens, toward the outer circumference, between the permanent magnet 2a of the rotor member 2 and the subrotor 4.

Figure 6:
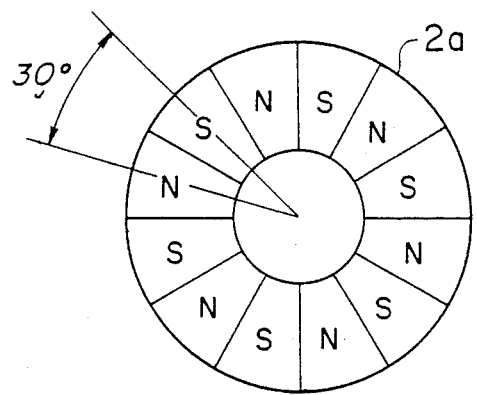
FIG. 6 is a view of a state in which a permanent magnet is magnetized.
Figure 7:
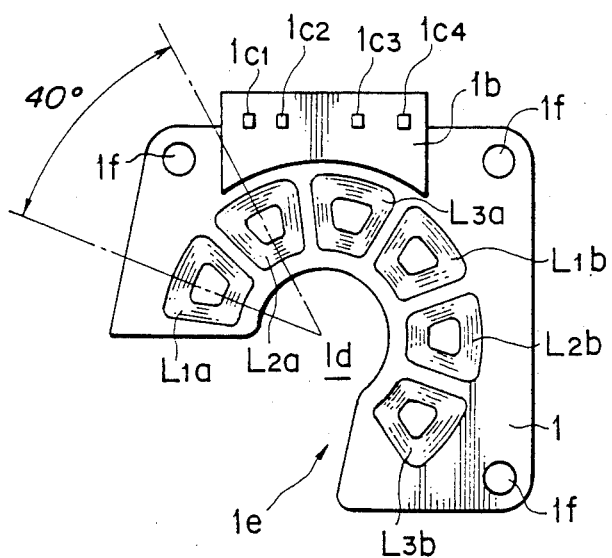
FIG. 7 is a front view of a stator coil member in the first embodiment form of the present invention.
Figure 8:
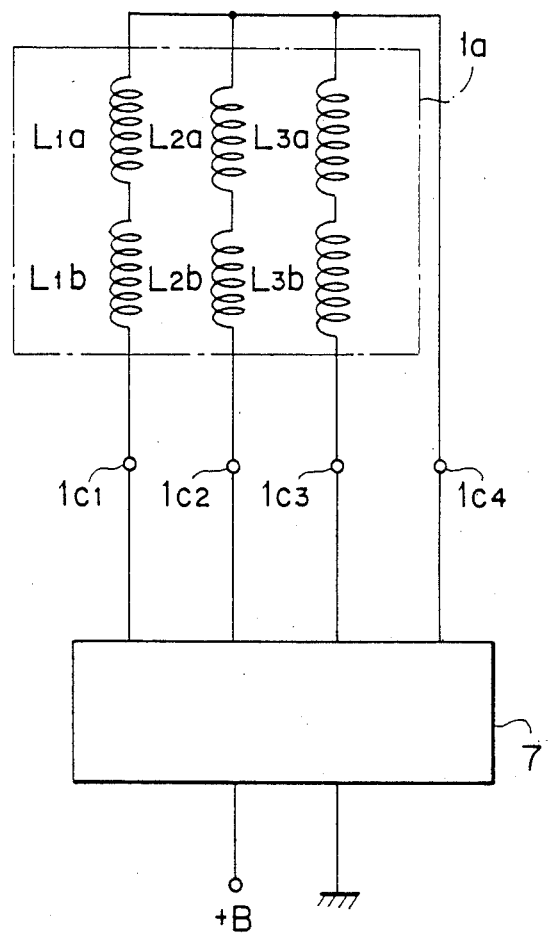
FIG. 8 is a driving coil connection diagram.

The above-mentioned permanent magnet 2a is of a twelve pole magnetization, as shown in FIG. 6. The magnetization angle pitch is set to 30 degrees. The driving coils 1a formed on the stator coil member 1 are closely provided and the number of the coils is six, as shown in FIG. 7. The angle pitches of the driving coils positioned is 40 degrees. When the six driving coils 1a are denoted by $L_{1a}$, $L_{2a}$, $L_{3a}$, $L_{1b}$, $L_{2b}$, $L_{3b}$ and the terminal member 1c is denoted by $1_{c1}$, $1_{c2}$, $1_{c3}$, $1_{c4}$, circuits are connected, as shown in FIG. 8. Its driving method is of a so-called three-phase half-wave driving system. The detection means for switching of respective driving coils 1a is of an induced voltage system. The control of these is performed by a control circuit 7. In addition to the shaft hole section 1d and the notch 1e, through holes 1f for the above-mentioned screws 6 are formed on the stator coil member 1, as shown in FIG. 7.

A shield wall 3d is formed so as to cover the outer circumference of the above-mentioned rotor member 2 or the stator coil member 1 by cutting and raising a portion of the above-mentioned bracket member 3. From this construction, influences upon circuit devices in the apparatus body, such as an amplifier circuit, a tuner circuit, a magnetic head or the like, due to the radiation of electromagnetic waves from the above-mentioned rotor member 2 or the stator coil member 1, are reduced when this motor is used.

Figure 9:
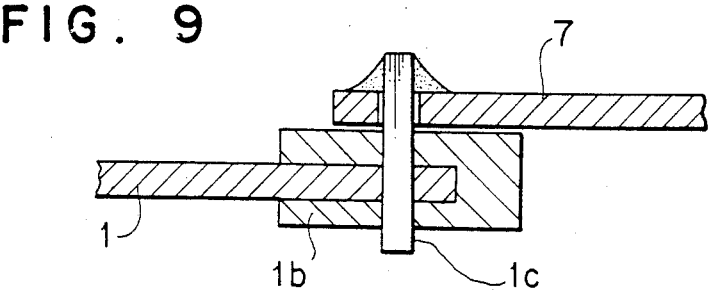
FIG. 9 is a cross-sectional view illustrating a state in which terminal members and a printed wiring board are connected.

As shown in FIG. 9, by making the terminal member 1c for supplying a current to the driving coils 1a of the above-mentioned stator coil member 1 project above the holding member 1b, it can easily be connected with the printed wiring board 8 constituting the above-mentioned control circuit 7.

Figure 10:
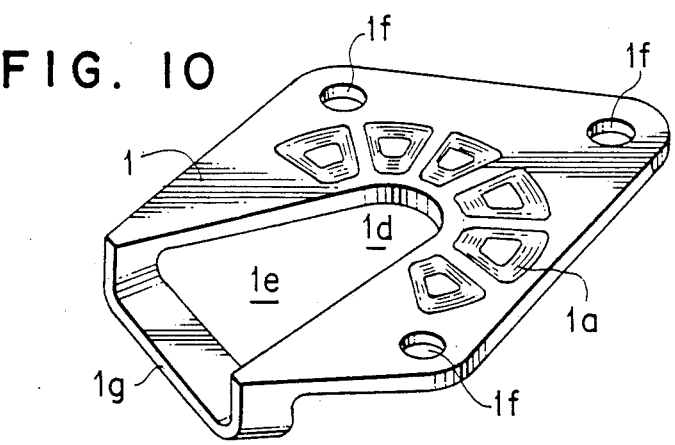
FIG. 10 is a perspective view illustrating a second embodiment form of a stator coil member.
Figure 11:
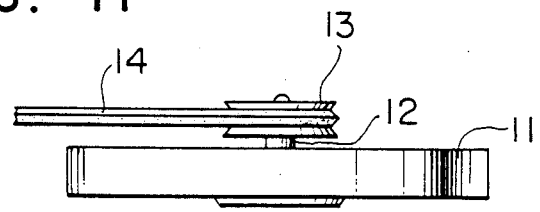
FIG. 11 is a side elevational view illustrating an example of the prior art.

FIG. 10 shows another embodiment of the present invention. A connection section 1g is integrally formed for avoiding and connecting the belt 5 at the edge of the notch 1e of the stator coil member 1. With this arrangement it is possible to aim at reinforcing the cutout 1e of the stator coil member 1. In this case, the connection section 1g is formed so as to be below the open section for taking out the belt 5. Of course, it is formed so as to prevent interference with the rotor member 2.

According to the present invention, a belt which is fitted to the pulley member for obtaining the output of a brushless motor is drawn out via the cutout of a stator coil member. As a result, the construction in which a belt is wound on the output pulley member projecting from the motor main body in the prior art is changed in to a construction in which a belt is wound on the pulley within the motor main body. Therefore, the thickness of the motor, including the output pulley member, is made remarkably thinner. The advantages are very great, and this is an extremely useful invention.

Many widely different embodiments of the present invention can be made without departing from the spirit and scope thereof, therefore it is to be understood that this invention is not limited to the specific embodiment thereof except as defined in the appended claims.

What is claimed is:

1. A brushless motor, comprising a stator coil member in which a cutout is formed so as to extend to a rotor shaft hole section in the center with a plurality of driving coils being arranged in said stator coil member in a part other than said cutout, a rotor member in which a permanent magnet that rotates oppositely facing said driving coils is held, a bracket member for holding said stator coil member and for rotatably holding said rotor member, and a subrotor member which is held in the rotor member in such a configuration that the stator coil member is put between itself and said permanent magnet of the rotor member, said subrotor being provided with a pulley member which rotates integrally with said rotor member and which is positioned on the rotor shaft hole section of said stator coil member so that a belt which is wound on said pulley member is pulled out via said cutout of said stator coil member.

2. A brushless motor as claimed in claim 1, wherein a portion of the bracket member is cut and raised so as to form a shield plate which covers the outer circumference of the rotor member or the stator coil member is provided.

3. A brushless motor as claimed in claim 1, wherein a holding member is provided for holding a terminal member that supplies a current to said driving coils of the stator coil member, and a terminal member connected to the end of a predetermined driving coil is projected from said holding member to used as a connection terminal.

4. A brushless motor as claimed in claim 2, wherein a holding member is provided for holding a terminal member that supplies a current to said driving coils of the stator coil member, and a terminal member connected to the end of a predetermined driving coil is projected from said holding member to be used as a connection terminal.

* * * * *